Nov. 16, 1965   R. P. DOERER ETAL   3,217,755
STRAND THREADING AND STRAND KNOTTING COMBINATION
Original Filed June 23, 1960                    7 Sheets-Sheet 1

INVENTORS
RICHARD P. DOERER
BY HERMAN G. GUENTHER

Whittemore, Hulbert & Belknap
ATTORNEYS

Nov. 16, 1965    R. P. DOERER ETAL    3,217,755
STRAND THREADING AND STRAND KNOTTING COMBINATION
Original Filed June 23, 1960    7 Sheets-Sheet 3

INVENTORS
RICHARD P. DOERER
BY HERMAN G. GUENTHER

Whittemore, Hulbert & Belknap
ATTORNEYS

United States Patent Office 3,217,755
Patented Nov. 16, 1965

3,217,755
STRAND THREADING AND STRAND
KNOTTING COMBINATION
Richard P. Doerer, Ypsilanti, Mich., and Herman G. Guenther, Bakersfield, Calif., assignors to Van Dresser Specialty Corporation, Warren, Mich., a corporation of Michigan
Original application June 23, 1960, Ser. No. 38,402. Divided and this application Oct. 15, 1964, Ser. No. 404,032
14 Claims. (Cl. 140—3)

This invention relates generally to a method and apparatus for making a strand-reinforced panel and refers more particularly to a method and apparatus for feeding reinforcing strands into the panel and knotting the ends of the strands.

This application is a division of our co-pending application Serial No. 38,402 filed June 23, 1960.

Reinforced fabric panels of the type described herein are manufactured by inserting elongated strands of reinforcing material into a web or panel of the fabric. A reinforced panel of this type may serve as an insulator between the overlying padding and underlying spring structure of an upholstered assembly, for example.

One of the objects of this invention is to provide a method of and apparatus for longitudinally feeding a reinforcing strand into a piece of material, and for twisting or knotting the strand ends.

Another object is to provide means for severing the portion of the strand in the piece of material from the remainder thereof.

Another object is to provide separate knotting or twisting structures to act on the opposite ends of the strand, one having a cutter and both having rotary bending elements.

Another object is to provide mandrels for the bending elements around which the loops are formed.

Another object is to provide means for flattening the strand ends for knotting.

Another object is to provide means for feeding a plurality of the strands transversely through pleats of a pleated panel, and knotting structure adapted to simultaneously knot all of the strand ends.

Other objects and features of the invention will become apparent as the description proceeds, especially when taken in conjunction with the accompanying drawings, wherein:

FIGURE 6 is a sectional view of the wire spiralling apparatus taken along the line 6—6 of FIGURE 4.

Figure 1:
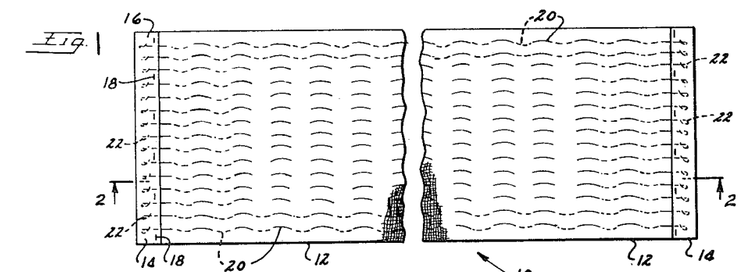
FIGURE 1 is a plan view of a strand reinforced fabric panel formed by the apparatus shown diagrammatically in FIGURE 3.
Figure 2:
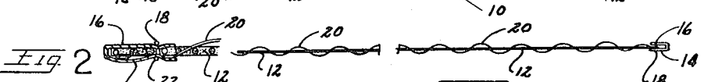
FIGURE 2 is a sectional view taken on the line 2—2 of FIGURE 1, with the left hand portion of the panel enlarged.

Referring now more particularly to the drawings, and especially to FIGURES 1 and 2, there is illustrated an insulator pad or panel 10 comprising a length of burlap 12 having its edge portions extended over strips 14. The strips 14 may be of paper or other suitable material and extend beyond the edges of the burlap and are turned onto the upper face of the burlap as shown at 16 in FIGURE 2. The turned edge portions 16 are suitably secured to the burlap, for example by gluing, stapling or sewing. To reinforce the panel, a number of strands of wire 20 are provided, each of which may if desired be undulatory or spiral in configuration as shown in FIGURES 1 and 2.

In order that the ends of the reinforcing strands 20 do not unduly project from the surface of the burlap, the reinforcing strands are preferably knotted at their ends as shown at 22 in FIGURE 1. By utilizing strips 14 as shown, the wire knots are shielded so as not to form sharp projections which might prove a safety hazard in handling of the panels and which might undesirably lock adjacent panels together when they are stacked on one another.

Several operations are required to form the articles shown in FIGURES 1 and 2. Thus, the burlap is cut to size, the strands 20 may be given an undulatory configuration and threaded through the burlap, the end portions of the wire strands are knotted, the strips 14 are applied to the burlap-strand assembly and folded over the edges thereof, and the entire assembly is adhered together at 18.

Figure 14:
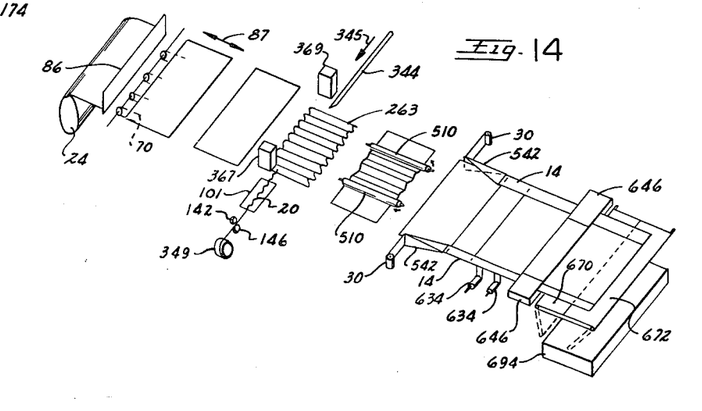
FIGURE 14 is a perspective view showing the operations performed on a fabric panel by the apparatus of FIGURE 3.

Referring to FIGURE 14, the fabric burlap material is taken from a supply reel 24 and advanced beneath a vertically reciprocating cutter 86 which cuts it into individual panels of a predetermined dimension (in the arrow 87 direction). The conveyor means at 70 locates each panel at a predetermined point thereon, and introduces each panel into a pleater mechanism which automatically gives the panel a pleated condition as shown at 263.

While the panel is still in a pleated condition hollow pointed tubes or needles 344 are passed transversely through the pleats in the arrow 345 direction. Immediately thereafter the rolls 142 and 146 are rotated to drive wire strands 20 into the hollow needles. It will be noted that the wire strands are taken from supply reels 349 in non-undulatory conditions and if desired are undulated in the undulation-producing mechanism generally designated by numeral 101. FIGURE 14 shows only one needle and one wire strand, but it will be appreciated from a study of FIGURE 3 that in actual practice a multiplicity of the needle-strand arrangements are utilized.

It will be appreciated that hollow tubes 344 act as guides to permit the wire strands to be rapidly advanced into and through the panel pleats. When the strands have been advanced into the tubes (or while they are being advanced therein) the tubes are retracted from the pleats, leaving the strands embedded or extended within the pleats. The strands are then cut and knotted at both ends by automatic mechanisms 367 and 369.

After the knotting operations the panel-strand assembly (with the panel still in a pleated condition) is advanced into position beneath rollers 510 which rotate about fixed axes to iron out the panel pleats and return the panel to a flat condition.

The panel is then advanced through the space between two traveling strips 14 which are taken from supply reels 30 and folded about the fabric panel edges by means of the folder structure 542.

The panel assembly is subsequently advanced over the adhering mechanism shown in FIGURE 14 as comprising the automatic stapling guns 634. The strips 14 are at this time still in the form of continuous strips, and such strips are therefore cut through at appropriate points by the automatic cutters 646.

As the last operation the complete panel assembly is passed onto the trap doors 670 and 672, which automatically swing down at a preappointed time to discharge the assembly into a shipping carton 694. When the carton is filled with a certain number or weight of panels it is replaced with an empty carton.

Figure 3:
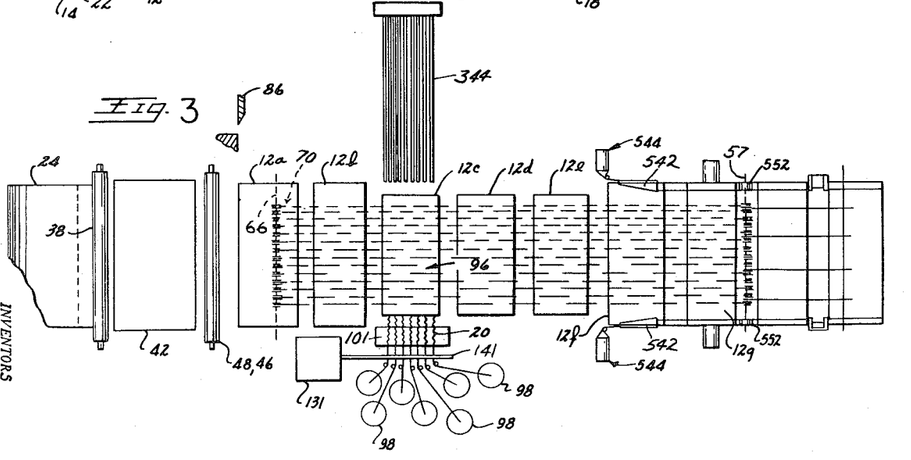
FIGURE 3 is a plan view diagrammatically showing the apparatus for forming the strand reinforced panels of FIGURE 1, indicating also the positions of various fabric panels as they are advanced through the apparatus.

Referring to FIGURE 3, the burlap is supplied from a reel 24 by a suitable feed roll, not shown, which is driven by any source of power. An idler roll 38 overlies and conceals the feed roll in FIGURE 3 and serves to maintain the burlap in driven engagement with the feed roll. The burlap moves through a trough 42 which serves as an accumulator space for maintaining a web supply for the cut-off structure or knife generally indicated at 86.

The burlap is fed from the bin by a rubber coated driver roll 46 and a rubber coated idler roll 48. The arrangement is such that as rolls 46 and 48 draw burlap from the trough, a switch is operated to energize the motor for the feed roll associated with idler roll 38 to replenish the supply of burlap in the trough.

The driver roll 46 is operated intermittently to advance the burlap a predetermined distance beyond the cutter or knife 86. After each intermittent advance of the continuous burlap web by the driver roll 46, the knife is operated to sever a panel of burlap from the leading end of the web, and the severed panel is deposited on and received by the conveyor chains 70 which extend longitudinally of the apparatus in laterally spaced relation, being trained over sprockets on the shaft 66 adjacent the cutter and sprockets on the shaft 57 spaced from the shaft 66 in the direction of advance of the fabric through the apparatus, or to the right as shown in FIGURES 3 and 14.

The conveyor chains are driven so that their parallel top flights, which lie in a common horizontal plane, move to the right as viewed in FIGURES 3 and 14. The chains 70 are synchronized with the driver roll 46 so that they advance the panels deposited thereon a distance equal to the advance or feed of the web of burlap by driver roll 46, the intermittent operation of the chains 70 occurring at the same time as the intermittent feed of the burlap by roll 46. Preferably the chains 70 are also briefly operated between intermittent operations of the web driving roll 46 to advance the cut panel deposited thereon a predetermined distance to provide the desired spacing between panels. The drive mechanisms for the roll 46 and for the chains 70, and the synchronization thereof are fully described in our co-epnding application Serial No. 38,402.

As an illustrative example, the roll 46 and chains 70 may be simultaneously actuated to advance the burlap supply past the upraised shear blade 86 a distance of 22 inches, and to carry a previously cut panel 12b for the same distance along the conveyor chains. While the roll 46 then remains motionless, the shear balde 86 is operated to cut a 22 inch panel 12a from the burlap supply which is deposited on the rear end of the chains 70. Thereupon the chains 70 are again operated to shift the cut panel 12a downstream, or to the right, by a predetermined amount, as for example 8 inches. During this time the roll 46 remains motionless. Thereafter, this same cycle is repeated over and over. The chains have longitudinally spaced barbs 71 (FIG. 12) thereon to hold the burlap in fixed positions.

Chains 70 are of a length sufficient to carry the burlap from the burlap panel cutter 86 through a pleating station, needle insertion, wire advancement station, needle retraction station, wire knotting station, and burlap unpleating station. As each panel is moved by the chains 70 it initially passes into the pleater station 96, the function of which is to distort the panel into a wave-like configuration as shown at 263 in FIGURE 14 to permit the wire strands 20 to be threaded therethrough.

Referring to FIGURE 3, the wire strands are supplied from suitable reels 98, there being one reel for each strand to be threaded into the panel. The illustrated machine is designed to simultaneously thread 18 wire strands into the panel, and there are therefore employed 18 supply reels 98 for the individual strands. Each strand as it comes from its reel is not undulatory, and it may be given an undulatory shape before threading through the panel. The mechanism for giving each wire strand an undulatory or spiral configuration is diagrammatically illustrated at 101 in FIGURES 3 and 14. This mechanism is shown in detail in FIGURE 6.

Figure 5:
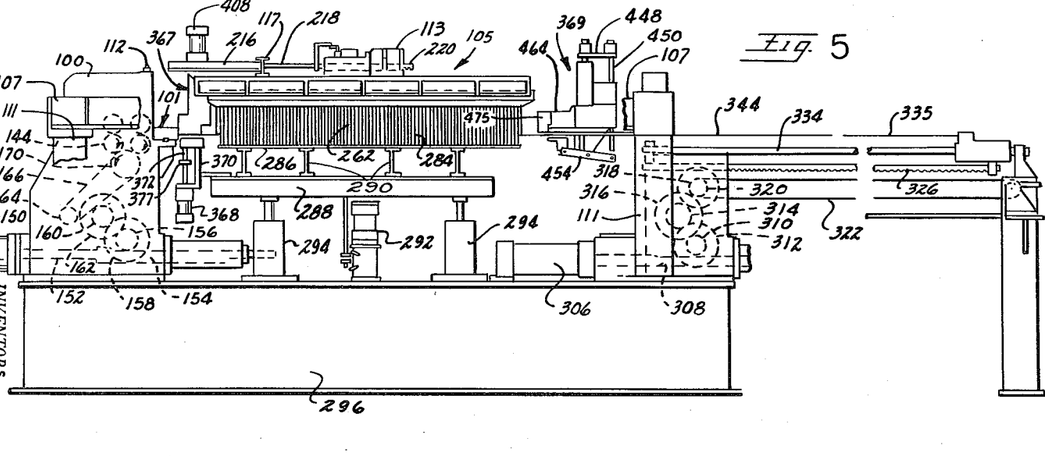
FIGURE 5 is an elevation of the structure shown in FIGURE 4.

Referring to FIGURES 5 and 14, the fixed housing structure 100 carries the wire feed mechanism. Each wire is fed from its reel through the undulating device 101 and into the pleated fabric by the cooperating discs 142 and 146, the wire being gripped between the peripheries of the discs. In FIGURE 14, only one pair of discs 142 and 146 for each wire is shown, but preferably two pairs of such discs are provided, as shown in FIGURE 5. A fluid cylinder 150 has a piston rod 152 provided with a rack 154 meshed with gear 156. By a series of distance multiplying gears 158 through 164, a multiplied movement is transmitted to chain 166. Chain 166 drives a shaft which carries a series of gears 170 (18 in the illustrated embodiment), the arrangement being such that each gear 170 meshes with the geared portions of the discs 146 to drive them clockwise (in FIG. 5). The discs 146 are respectively geared to the discs 142 so that as a result the individual wire strands are fed from their respective reels through the undulatory device 101 and into the pleated panel. Suitable one-way clutch means is located in the drive from rack 154 and chain 166 such that reverse movement of the rack will not reverse rotate the discs 142 and 146.

The cylinder 150 is operated to intermittently feed the 18 wire strands simultaneously from their respective reels. After each feeding movement of the wire strands, the bar 141 extending across the wire strands descends by gravity and pulls a fresh supply of wire from the reels 98. If the wire on any reel becomes tangled so that it will not readily pull from the reel, that particular strand will remain taut and will prevent the gravitational descent of the bar 141. The bar 141 is connected with a suitable safety shut-off mechanism 131, the arrangement being such that failure of the bar 141 to descend at the dictated time will halt the cycle. The attendant may then take care of any entanglements.

The strand spiralling mechansim 101 is provided to impart a spiral configuration to the wire strands which are of course straight when they leave the cooperating discs 142 and 146 of the wire feed mechanism. The spiralling mechanism comprises a base 174 having a series of 18 separate block elements or supports 176 adjustably secured thereon by means of set screws 178 which extend through a cover plate 180. The cover plate 180 extends laterally over all of the various block elements or supports 176 and is fixedly secured to the base 174 by a plurality of spaced screws 182. Spacers (not shown) are provided at the ends of the base 174 and cover plate to hold the two in the spaced positions illustrated in FIGURE 6.

The downstream face of each support or block element 176 is provided with an enlarged bore, and one end portion of a former rod 186 is closely received and secured in the bore by a suitable set screw as shown. Each rod 186 is provided in its outer surface with a straight groove portion 188 which extends from the end thereof received in the block element 176 and leads to a spiral groove portion 190 which extends entirely to the opposite or downstream end of the rod. The arrangement is such that as the wire strand is fed into the groove portion 190 by the action of the discs 142 and 146 of the wire feed mechanism it is twisted into a spiral configuration. Former rod 186 extends through a tubular member or sleeve 192, the internal surface of which closely surrounds the rod and cooperates with the groove portion 190 in forming a spiral passageway for the strand. It will be understood that the bore of block element 176 in which the end of the former rod is received cooperates with the straight groove portion 188 to complete the definition of the passageway for the strand. In order to minimize wear on the internal surface of sleeve 192, the sleeve preferably has a rotatable fit on the rod 186 so that the sleeve can turn under the influence of the advancing strand whereby different portions of the internal surface of the sleeve are presented to the spiral groove portion 190 during successive spiralling operations so as to prolong the life of the sleeve. In this connection, it will be appreciated that the strand spiralling operations are carried out at relatively high speeds, and the abrasive action on the sleeve may become excessive.

A second rod 196 is provided which is aligned with rod 186 and in substantial end to end abutting relation therewith. The rod 196 is slightly larger in diameter than the rod 186 and has in its outer surface a spiral groove 194 extending from end to end thereof. The end of the spiral groove portion 190 in rod 186 registers with the end of spiral groove 194 so that a strand can pass continuously through the two grooves in sequence. Each rod 196 is closely received within a bore in a block or support 198 and secured thereto by means of a set screw as shown. The internal passage or bore in the block 198 closely surrounds the rod 196 and cooperates with the groove 194 to define a passageway for the strand. The upper face of each block 198 is provided with a pair of V-shaped grooves 200 which form cam surfaces for cooperation with the conical end portions of set screws 202. Accordingly, the block 198 may be adjusted in the direction of length of rod 196, that is in the direction of the arrow 204. When in the desired position of axial adjustment, the screws 202 may be advanced into the V-shaped grooves 200 to lock the adjustment. Preferably the position of the block 198 is such that the rods 186 and 196 substantially abut in end to end relation as shown, so that there is a minimum clearance between the sleeve 192 and the end face of block 198. The end of sleeve 192 should have a slight clearance with the block 198 and with the end of rod 196 so that the sleeve is free to rotate and not clamp against the downstream face of block 176.

The right end portion of block 198 as shown in FIGURE 6 carries a cut-off block 206 which defines a face 208 located to be traversed by a reciprocating cutter 210. It will be understood that at a predetermined point in the operating cycle, the cutter 210 will be moved downwardly across the cut-off block to sever a length of the formed spiral strand.

As seen in FIGURE 6, the major diameter of the groove 194 is slightly greater than the major diameter of the groove 190. Also the pitch of the groove 194 as denoted by dimension 214, is greater than the pitch of groove 190 as denoted by dimension 215. These differences are designed to accommodate the tendency of the wire strand to spring back after its deformation in groove 190. The diameter and pitch of groove 194 will accommodate substantially all of the springback so that the wire strand in groove 194 is unstressed, and a precise length thereof will be discharged past the block 206 during each operating cycle. In this manner the subsequent operations on the strand are more accurately performed and the resultant product (FIGS. 1 and 2) is more uniform.

As seen in FIGURE 6, the block 176 is formed with concave surfaces 392 which are substantially concentric with the discs 142 and 146 and extend in between the discs. The edge where the concave surfaces meet extends into the bite between the discs. A passage 393 in block 176 extends from the edge where the concave surfaces meet, to the passage formed by the strand portion 188 of the groove in rod 186 and is aligned with groove portion 188. Hence a wire strand fed from the discs 142 and 146 enters the spiralling mechanism through the passage 393 and is fed continuously through the spiral passages provided by the rods 186 and 196 to be given the desired spiral configuration.

The undulating or spiralling mechanism 101 shown in FIGURE 6 may be employed with some or all of the strands, that is some of the strands may be fed into the fabric panel without being spiralled and some of the strands may be given different undulatory shapes than that produced by the mechanism of FIGURE 6. Also, some of the strands may be of relatively heavy gauge, and some may be of relatively light gauge in accordance with different characteristics to be given to different areas of the final product. Those other strands which are to be given the same spiral configuration as the strand shown in FIGURE 6 will of course be formed to spiral configuration by similar apparatus to that shown in FIGURE 6.

Figure 4:
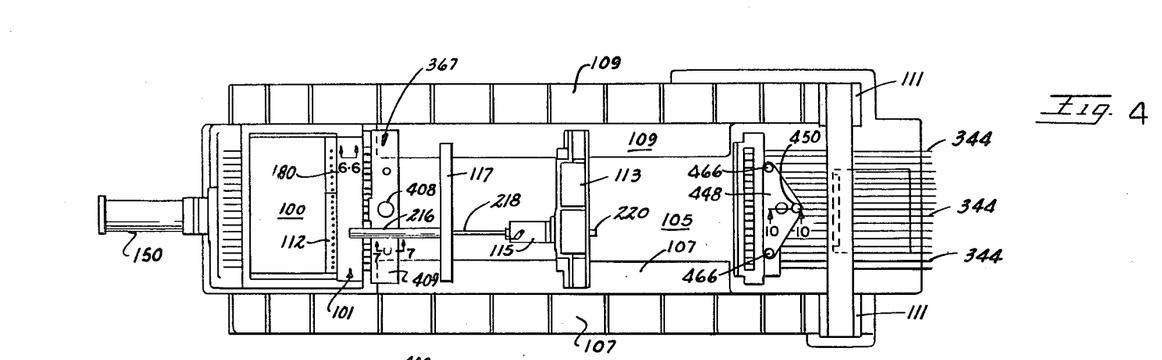
FIGURE 4 is a plan view of portions of the apparatus shown in FIGURE 3, including the pleater.

Referring to FIGURES 4 and 5, it will be seen that after the individual wire strands have been fed through the device 101, they are forced into a pleater station 96 which operates to form and maintain the burlap panel in a pleated condition during insertion of the wire strands.

Figure 11:
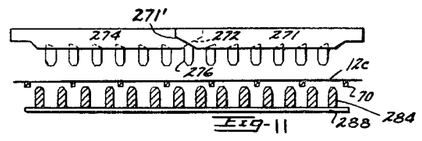
FIGURE 11 is a diagrammatic view of certain operating components of the pleater structure in retracted position.
Figure 12:
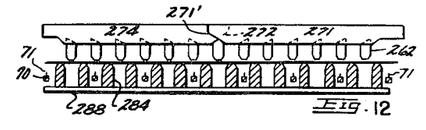
FIGURE 12 is a view similar to FIGURE 11 but showing the components in an intermediate position.

The pleater operation may best be visualized by referring to schematic illustrations in FIGURES 11 and 12. As shown in FIGURE 11, the burlap panel 12c is supported on the conveyor chains 70. Disposed beneath and between the various chains 70 are the elongated lower pleater elements or bars 284 which are each of a length corresponding to the cut length of the panel (that is the dimension in the direction of arrow 87 in FIGURE 14) plus an appropriate factor or margin. The various pleater bars 284 are carried on an elevator 288, and when the elevator is raised from its FIGURE 11 position to its FIGURE 12 position the various pleater bars 284 are projected upwardly between the chains 70 so as to lift the burlap panel from the chains as shown in FIGURE 12. In its FIGURE 12 position the panel is located very closely adjacent to the lower edges of an upper set of pleater bars 262. There are provided a center pleater bar, designated by numeral 276, and additional pleater bars on both sides thereof. The pleater bars at the left of center pleater bar 276, as well as center pleater bar 276, are notched at their upper edges to form cam surfaces 390 for causing the bars to be cammed downwardly by leftward movement of the overlying cam bar 271. The pleater bars at the right of center pleater bar 276, as well as center pleater bar 276, are suitably notched at their upper edges to form cam surfaces 391 for causing the bars to be cammed downwardly by rightward movement of cam bar 274. The cam bars 271 and 274 are shown retracted in FIGURES 11 and 12, and the pleater bars over which they extend when retracted are suitably notched to clear the cam bars. Suitable spring means, not shown, are provided to retract the upper set of pleater elements 262 to the FIGURE 11 position when the cam bars are retracted as illustrated.

In the preferred operation the cam members or bars 271 and 274 are moved simultaneously in opposite directions so as to cross one another and sequentially depress the various pleater bars in the upper set of bars, beginning from the center pleater bar 276 and continuing laterally outwardly with depressions of successive bars on both sides of the center pleater bar. The arrangement is such that initially the center pleater bar 276 is depressed downwardly so as to cooperate with the subjacent pleater bars to tightly grip the center area of the burlap panel. Therefore, as the other pleater bars come down successively the panel will maintain its position relative to the longitudinal center line of the machine such that very little lateral bodily shifting of the panel will occur. Since the outermost pleater bars will not come down until the innermost pleater bars have been depressed there will be no excessive strain placed on the burlap such as might tear or deform the burlap fibers.

FIGURE 4 provides an elevational view of the pleater station which, as will be seen, comprises two ribbed beams 107 and 109 supported at their ends by pillars 111. A bridge structure 113 extends across the space between beams 107 and 109 to rigidify them and provide a support for housing 115. Cylinder 216 has a rod 218 which extends into housing 115 to operate cam bars 271 and 274 by suitable mechanism not shown.

The foregoing brief description provides a general outline of the mode of operation of the panel pleating structure. For a more detailed description reference is made to applicants' co-pending parent application, Serial No. 38,402.

Figure 13:
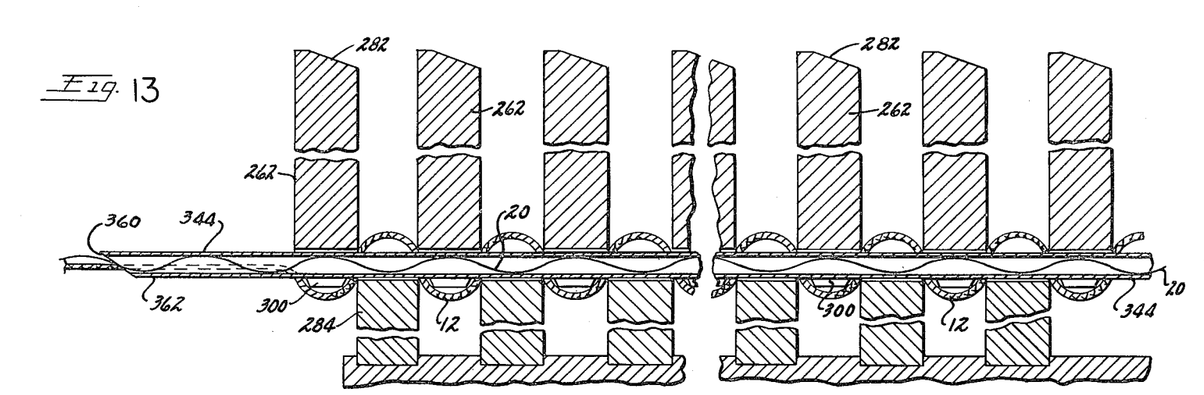
FIGURE 13 is a sectional view showing the needle and strand structure between the pleater elements.

It will be noted from FIGURE 13 that the lower edge portion of each pleater element 262 is provided with a series of slots 300. In the illustrated mechanism each of the pleater elements 262 is provided with eighteen slots corresponding in number to the number of wire strands to be inserted through the fabric pleats. Each of the pleater elements in the lower set of pleater elements 284 is provided with a corresponding number of slots 302 in its upper edge, the arrangement being such that when the pleaters are in their FIGURE 13 positions a series of eighteen passages is formed through the pleater element assembly.

The purpose of these passages is to permit hollow needle structures to be driven through the fabric pleats, said needle structures serving as guides for subsequent insertion of the spiral wire strands previously described.

Power for the needle insertion operation is derived from a fluid cylinder 306 shown in FIGURE 5. The piston rod for cylinder 306 carries a rack 308 which meshes with a gear 310 carried by the shaft of a larger gear 312. Gear 312 in turn meshes with a gear 314 carried by the shaft of a relatively large gear 316 which meshes with the gear 320 carried on the shaft of a larger gear 318. The gear 318 meshes with a rack 326 which is connected at one end to a crosshead 330 slidably supported on fixed guide rods 334. The crosshead 330 carries eighteen hollow needles 344, the arrangement being such that energization of cylinder 306 is effective to move rack 326 to the left as viewed in FIGURE 5 to thereby carry the needles 344 through the pleater elements and pleated fabric panel as shown in FIGURE 13. The slots 300 and 302 in the adjacent edges of the pleater elements 262 and 284 line up transversely of the machine when the pleater elements are moved toward each other as shown in FIGURE 13 to provide elongated passages adapted to receive the respective needles. The needles are actually hollow tubes and are inserted through the pleated fabric prior to insertion of the wires to serve as guides and prevent deflection or jamming of the wires during insertion of the latter.

The leading edge of each needle is sharply pointed as at 360, with the edge portion 362 tapering back at a small angle to form a pointed end operative to easily penetrate the burlap panel during high speed insertion of the needle. When the needles are located within the pleater elements as shown in FIGURE 13, the cylinder 150 (FIGS. 4 and 5) is energized to feed the wire strands through the spiralling mechanism and into the hollow needles to the FIGURE 13 position. The hollow needles protect the wire strands during insertion so they will not interfere with the burlap threads.

It is contemplated that the insertion of the needles will be completed before introduction of the wires into the pointed ends of the needles. However, the needles may retract during the advance of the wires, the most important aim being to have at least the ends of the wire strands within the needles as the strands are fed through the pleats. However, the needles may remain in the extended position within the pleater station during the entire strand advancing operation.

After insertion of the wire strands into the extended hollow needles, the hollow needles are withdrawn to leave the strands threaded through the pleats of the fabric panel. The wire strands will then be severed and knotted at both ends. Preferably, the strand knotting operation is performed at the conclusion of the strand insertion operation while the fabric is in a pleated condition. The left hand knotter mechanism is shown at 367 and the right hand knotter at 369.

Figure 7:
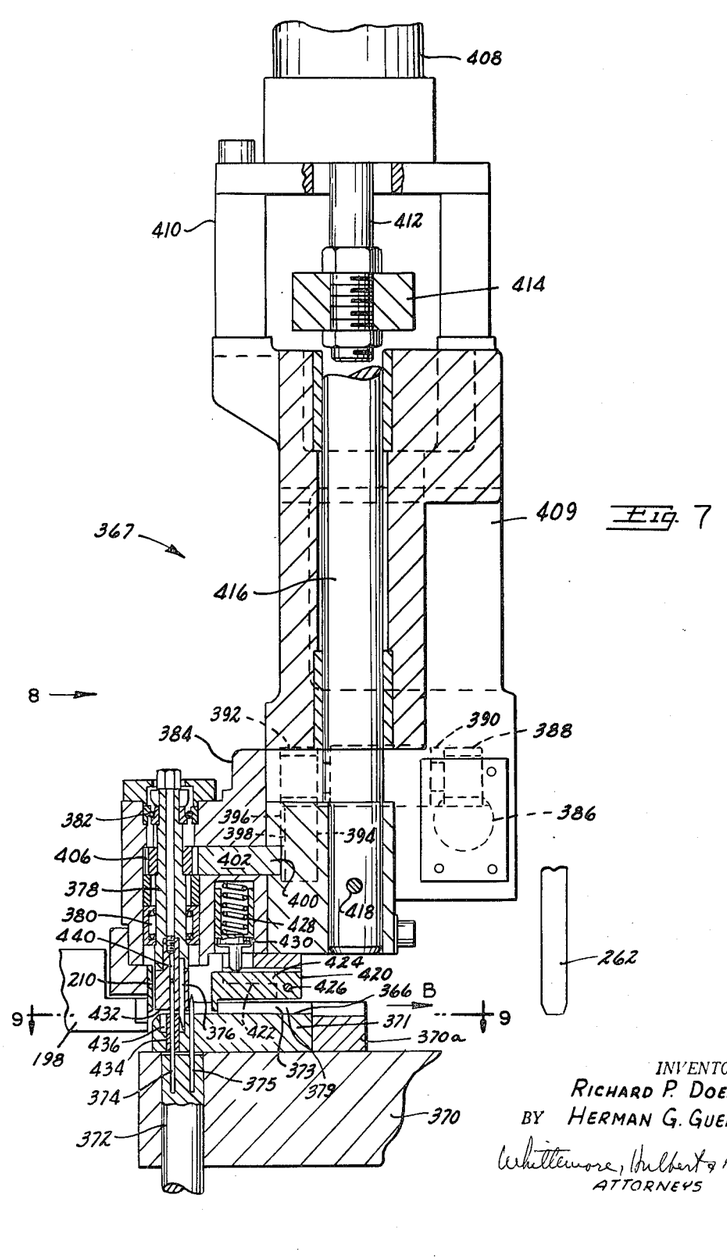
FIGURE 7 is an enlarged sectional view on the line 7—7 of FIGURE 4 showing one of the knotting devices.
Figure 8:
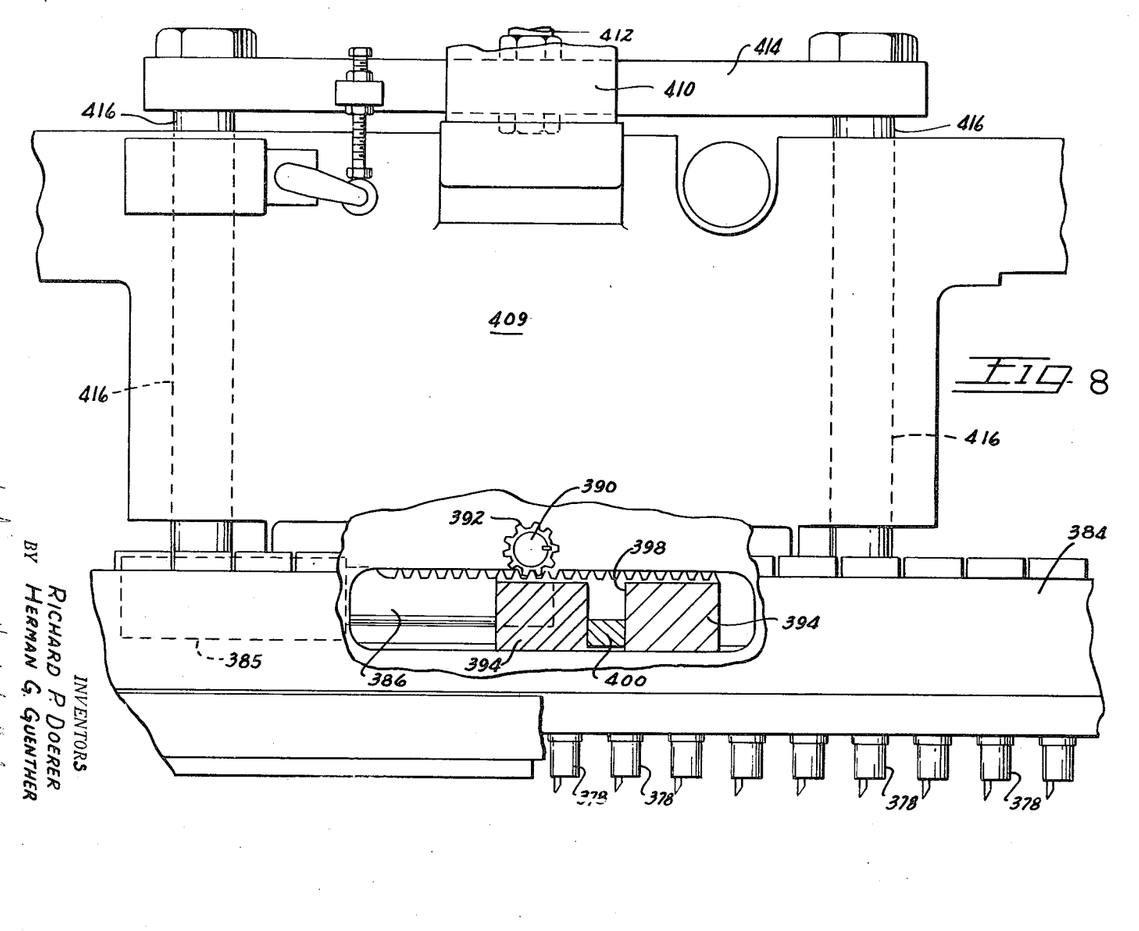
FIGURE 8 is an elevation taken in the direction of the arrow 8 in FIGURE 7.
Figure 9:
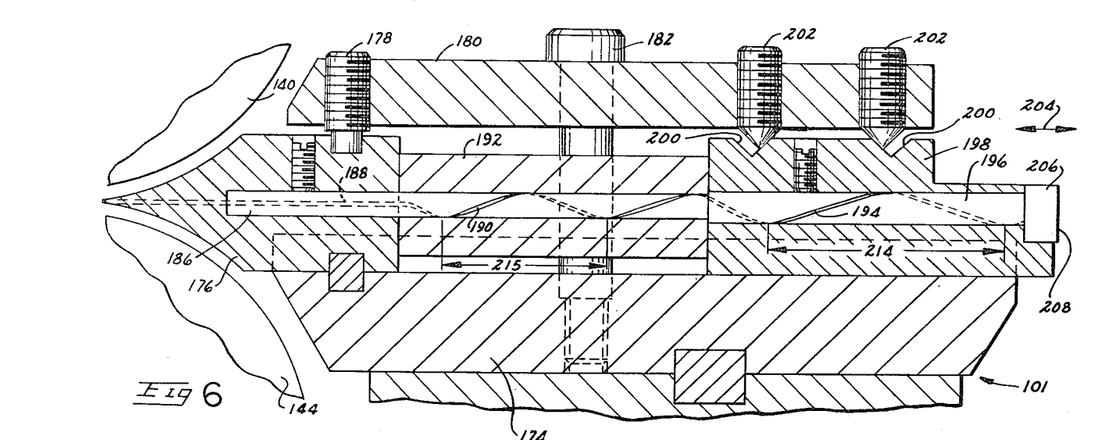
FIGURE 9 is a sectional view taken on the line 9—9 of FIGURE 7.
Figure 10:
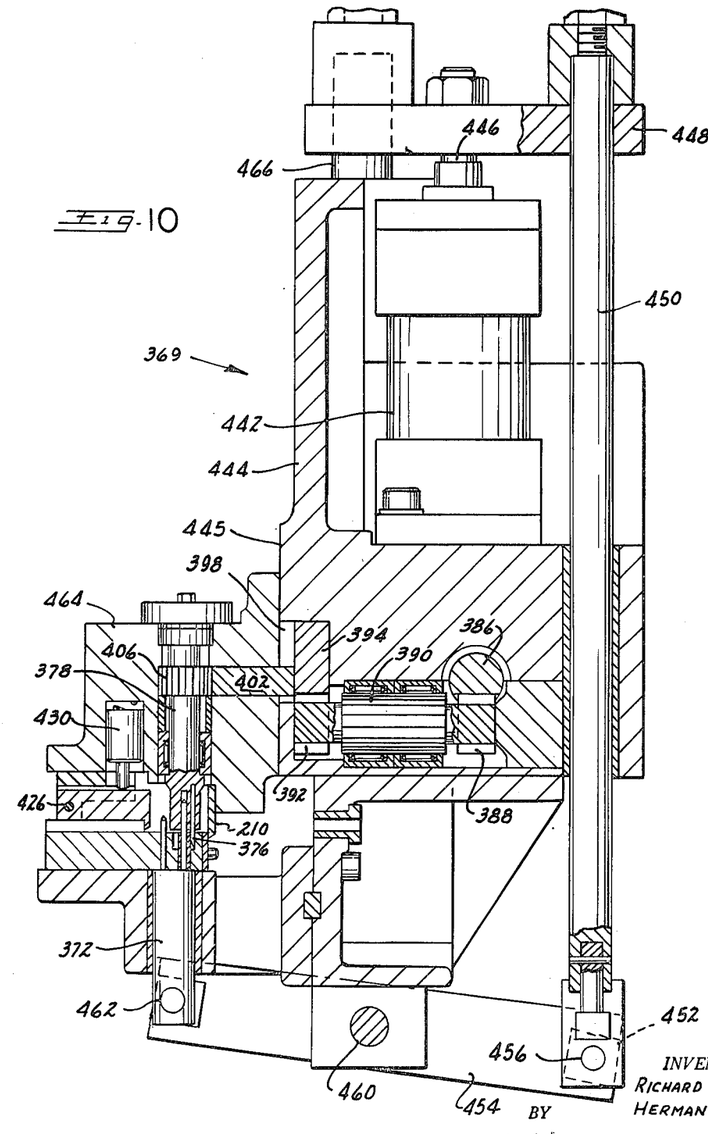
FIGURE 10 is a sectional view taken on the line 10—10 of FIGURE 4, showing the other knotter.

Referring to FIGURE 1, it will be noted that the ends of the wire strands in the finished article are curled around or knotted. The strand knotting operation is preferably performed at the conclusion of the strand insertion operation while the fabric is in a pleated condition (FIG. 13). The leftmost knotter mechanism is 367 as shown in FIGURES 7–9, and the rightmost knotter 369 is shown in FIGURE 10. The positions of these knotter mechanisms with respect to the other apparatus is best shown in FIGURES 4 and 5.

Referring to FIGURE 7, the leftmost knotter comprises an elongated bed plate 371 having a series of spaced blocks 379 secured thereon to define eighteen separate grooves 373, the arrangement being such that one of the strands 20 travels through each groove in the direction of the arrow B during the strand insertion operation. The mechanism is shown in FIGURE 7 with the parts thereof in the positions they occupy during the knotting operation, and the space through which the strand travels during the strand insertion operation is therefore restricted by the knotter mechanisms.

Power for the knotting operation is derived from three sources. Thus, referring to FIGURES 4 and 5 there is provided a fluid cylinder 368 carried on a bracket-forming extension 370 of the elevator 288. The piston rod for cylinder 368 is connected with eighteen parallel plungers 372 (FIGS. 5 and 7) by means of a crosshead 377 so that energization of cylinder 368 is effective to move the plungers upwardly toward the bed plate 371 to the FIGURE 7 position. Each plunger 372 carries a pin-like mandrel element 374 which projects upwardly above the bed surface 366 to form a mandrel surface for bending of the wire strand therearound during the knotting operation. Each plunger also carries a pin 375 which functions as a back-up device for the wire strand during the knotting operation.

In order to bend the wire strands around mandrels 374 there is provided a pin-like bending element 376 carried on a rotary head 378. Bearings are provided at 380 and 382 for rotatably supporting the head 378 in a carrier structure generally indicated by numeral 384. Power for rotation of the head 378 is derived from a fluid cylinder 385 and rack 386. The drive from rack 386 comprises a gear 388 carried on shaft 390, a second gear 392 carried on shaft 390 and a rack 394 meshed with gear 392. The vertical face 396 of rack 394 is provided with a slot 398 which receives an extension 400 of a relatively long rack 402. It will be noted from FIGURE 8 that rack 386 is of relatively short length. However, the rack 402 is long enough to span the entire bank of knotter heads 378, with the teeth thereof engaging the gear portions 406 of the individual heads 378 as shown in FIGURE 7.

It will be appreciated that movement of rack 386 (by cylinder 385) in one direction is effective to rotate all of the knotter heads 378 in one direction for effecting a strand knotting operation. Reverse movement of the rack 386 is effective to return the heads 378 to their initial positions.

Between successive knotting operations the carrier 384 is retracted upwardly away from the bed surface 366 by means of the fluid cylinder 408. Cylinder 408 is mounted atop a bridge structure 410 located on an elongated housing 409. As will be seen from FIGURE 4, housing 409 is mounted at its opposite ends on the beams 107 and 109. The piston rod 412 for cylinder 408 is connected with a crosshead 414 which carries the two depending rods 416 at its opposite ends. The lower end portions of these rods are anchored to the carrier 384 by means of cross pins 418. The arrangement is such that pumping of fluid into the lower end of cylinder 408 is effective to raise the carrier 384 upwardly from bed surface 366 to permit passage of the wire strands over the bed surface and into the pleater elements.

After each pleater operation pressure fluid is pumped into the upper end of cylinder 408 to quickly lower carrier 384 toward surface 366. As the carrier nears surface 366 cutter 210 slices through the wire strand to cut off the length thereof to the right of the cutter. During the cut-off operation the clamp structure 420 is effective to grip the wire and retain it in proper position for ensuring a clean cut at the desired location therealong. Clamp structure 420 comprises a series of spaced finger members 422 projecting downwardly from the carrier 384, the space between adjacent fingers being occupied by strand gripping elements 424, and the various strand gripping elements being pivotally mounted by means of a pin 426 extending through finger members 422. It will be understood that in a construction having eighteen wire strand feeders there will also be employed eighteen wire gripper elements 424.

Each of the wire gripper elements is individually biased in a downward direction by means of a compression spring 428, said spring operating on the gripper element via a hollow plunger 430. The operation is such that as the carrier 384 is lowered its pivotally mounted gripper elements 424 strike the wire strands and compress the springs 428 to thereby provide a tight grip on the strands irrespective of any slight variation in vertical dimension of the various gripper elements spacing of bed surface 366 from the carrier, or variation in strand thickness.

It will be noted that the tip of cutter 210 is located slightly below the lower face 432 of the knotter head 378. Face 432 acts as a presser element to cooperate with the upper face of the fixed bushing 434 in ironing out a short portion of the wire strand from its spiral configuration, the purpose being to prevent an intermediate portion of the wire strand from interfering with its extreme end portion during the knotting operation. In this connection the major diameter of the spiral strand convolution is in an illustrative case in the neighborhood of one-quarter inch and the diameter of the wire is in the neighborhood of .040 inch. The movement of the carrier is preferably such as to leave a clearance of about .050 inch between face 432 and the upper face of bushing 434.

When rack 386 is moved to rotate the heads 378 the resultant rotation of each bending element 376 is such that a wire end portion adjacent cutter 210 is curled around the mandrel 374 and depressed into the annular opening 436 as the pin 376 nears the end of its rotary movement. Pin 376 is shown in FIGURE 7 adjacent the end of its movement. It initially takes a position spaced about one hundred eighty radial degrees from the FIGURE 7 position, so that it acts as a bending element for the end portion of the wire strand. During the final stage of the bending movement the end portion of the wire may cam against the registering wire portion to be deflected into the recess 436 so as to achieve the cross condition shown in FIGURE 1.

The complete sequence of movements in operation of the FIGURE 7 knotter structure is as follows. With the carrier 384 in a raised position, at conclusion of the strand feeding operation the cylinder 408 is energized to quickly lower the carrier 384 and cut off the wire strand. Simultaneously with lowering of the carrier 384 the plungers 372 are powered upwardly by cylinder 368 so that the mandrel 374 is guided into the central opening 440 in each head 378. Rack 386 is then powered to rotate the various knotter heads 378 for causing the bending elements 376 to be rotated around the mandrels 374 to effect the knotting operations. Carrier 384 and plunger 372 are then powered apart to separate or strip the elements 374 and 376 from the knot. Elevator 288 (FIG. 5) is then lowered to lower the lower set of pleater elements so that the fabric-wire strand assembly is deposited onto the conveyor chains 70 for carry-over to the next operating station.

The right knotter structure 369 shown in FIGURE 10 is similar to the left knotter in many respects, and similar reference numerals are therefore employed wherever applicable. In the FIGURE 10 construction a fluid cylinder 442 is mounted on a fixed support structure 444 with its piston rod 446 connected with a crosshead 448, said crosshead carrying a depending connector rod 450 which is linked at 452 to a pair of levers 454. The linkage 452 preferably comprises an elongated shaft 456 extending between the two levers 454, said levers being preferably located at opposite end portions of the knotter apparatus and being fulcrumed on an elongated shaft 460 carried by support structure 444. The two levers 454 are linked to an elongated shaft 462 which carries a bank of reciprocable plungers 372, each of the plungers carrying a mandrel and back-up pin similar to the corresponding elements of the FIGURE 7 structure. Each of the mandrels cooperates with a rotary knotter head 378 similar to the corresponding head in the FIGURE 7 construction. The various knotter heads are rotatably supported in a carrier 464 which is slidably mounted on face 445 of support structure 444. Carrier 464 is supported at its ends by the two rods 466 which depend from crosshead 448.

In operation of the FIGURE 10 construction, energization of the fluid cylinder 442 is effective to move rod 450 upwardly for downward retraction of the plungers 372; simultaneously the carrier 464 is drawn upwardly by the rods 466 to free the right end area of the fabric-wire strand article for movement by the conveyor chains 70. After a predetermined movement of the conveyor chains the cylinder 292 is energized to raise elevator 288. Thereafter piston rod 446 is powered downwardly to bring elements 378 and 372 together, and rack 386 is powered to effect a knotting operation of pin 376.

During the knotting operations the fabric panel is held in a pleated condition with the needles of course withdrawn. The wire strands 20 frictionally engage the burlap fibers and tend to hold the pleated form of the panel. Accordingly, after the inserted wire strands have been knotted, the fluid cylinder 216 is operated to allow the upper pleater elements to return to the position of FIGURES 11 and 12, the cylinder 292 is operated to lower the elevator 288 carrying the lower pleater elements to the position of FIGURE 11, and the strand reinforced panel is moved to a flattening or unpleating station which has the rubber-coated rolls 510. The panel is carried from the pleater to the unpleating station by the conveyor chains 70 during subsequent intermittent operation thereof. The rolls 510 flatten the pleated panel so that it assumes substantially the configuration shown in FIGURE 2. The flattening station is more fully described in our copending application, Serial No. 38,402.

Thereafter, the conveyor chains 70 transfer the panel through the space between the traveling strips 14 which are taken from supply rolls 30 and folded about the edges of the fabric panel by means of the folder structure 542. In FIGURE 3, the panel 12f is shown between the folder structures. Panel 12e is approximately at the unpleating or flattening station and panel 12d is in an intermediate position.

The stapling guns 634 in FIGURE 14 secure the folded strips to the edges of the reinforced panel, and thereafter the complete panel assembly is transferred to the point of discharge over the trap doors 670 and 672 which automatically open to deposit the panel assembly into a shipping carton.

The apparatus illustrated and described herein is operated so as to cut the fabric panels to length before pleating and insertion and knotting of the reinforcing strands. However, the panels could be cut to length after insertion and knotting of the strands. The shear blade 86 can be placed at the downstream end of the machine so that the severing of the individual panels occurs only after all of the other operations, pleating, strand insertion, knotting, unpleating, etc., have been completed. Apparatus as thus modified, in which the panels are severed as the last operation, is described in our co-pending application Serial No. 38,402. Accordingly, the piece of material into which the strands are inserted may be either the individual panels or the continuous web before it is severed into panels. Stated another way, the panels into which the strands are inserted may be either separate members already severed from the continuous web, or they may be unsevered and still an integral part of the web.

Whether the panels are severed before pleating, as illustrated and described, or as the final operation, the operation of the strand feeding and knotting apparatus will be the same.

What we claim as our invention is:

1. The method of making a strand-reinforced piece of fabric or like material comprising longitudinally feeding a strand of undulating form into the material, severing the portion of the strand in the material from the remainder thereof, flattening out the undulations near the ends of the severed strand portion, and twisting the ends into loops.

2. The method of making a strand-reinforced piece of burlap or like material comprising longitudinally feeding a plurality of laterally spaced parallel strands of undulating form transversely through the pleats of a pleated piece of the material, severing the portions of the strands in the material from the remaining portions thereof, clamping the severed strand portions near the ends thereof, flattening the undulations outward of the points of clamping, and twisting the ends to form loops.

3. Mechanism for making a strand-reinforced piece of fabric or like material, comprising means for longitudinally feeding a strand into the material from one side thereof to the other, a cutter adapted to sever the portion of said strand in the material from the remainder thereof, means for twisting the ends of the severed strand portion into loops including separate supports at opposite sides of the material, said supports being disposed at one side of the feed path of the strand and facing said feed path, structures opposed to said supports and movable transversely of said feed path from a retracted position at the opposite side of said feed path in a direction toward said supports to an operative position, and rotary bending elements on said structures adapted to form loops in the ends of the several strand portion in the operative positions of said structures.

4. The mechanism defined in claim 3, wherein mandrel elements are disposed within the arcs described by said bending elements around which the loops are formed by said bending elements.

5. The mechanism defined in claim 3, wherein said movable structures and supports have cooperative means for engaging the strand and holding it flat in response to movement of said movable structures toward said supports.

6. Mechanism for making a strand-reinforced piece of fabric or like material, comprising means for longitudinally feeding a strand into the material from one side thereof to the other, means for severing the portion of the strand in the material from the remainder thereof and for twisting the ends of the severed strand portion into loops including separate supports at opposite sides of the material, movable structures opposed to said supports and movable toward said supports in a direction transversely of the feed path of said strand to an operative position, a cutter on one of said structures adapted to sever the portion of said strand in the material from the remainder thereof in response to the movement of said one structure toward said support, rotary bending elements on said structures adapted to form loops in the ends of the severed strand portion in the operative positions of said structures, and mandrel elements projecting from said supports within the arcs described by said bending elements around which the loops are formed by said bending elements.

7. The mechanism defined in claim 6, wherein said strand is of undulating form, and said movable structures and supports have cooperative means for flattening the undulations in said strand in response to movement of said movable structures toward said supports.

8. Mechanism for making a strand-reinforced piece of burlap or like material, comprising means for holding the material in a pleated condition, means for longitudinally feeding a strand transversely through said pleats from one side of the material to the other, supports underlying opposite sides of the material, movable structures above said supports and movable toward said supports to operative positions, a cutter on one of said movable structures adapted to sever the portion of the strand in the material from the remainder thereof in response to movement of said one structure to operative position, rotary bending elements mounted on said movable structures for rotation about vertical axes and adapted to form loops in the ends of the severed strand portion when said movable structures are in their operative positions, and mandrels projecting from said supports toward said movable structures within the arcs described by said bending elements around which the loops are formed by said bending elements.

9. Mechanism for making a strand-reinforced piece of burlap or like material, comprising means for holding the material in a pleated condition, means for longitudinally feeding a plurality of laterally spaced, parallel strands transversely through said pleats from one side of the material to the other, supports underlying opposite sides of the material, vertically movable structures above said supports, a cutter on one of said movable structures adapted to sever the portions of said strands in the material from the remaining portions thereof in response to downward movement of said one structure to operative position, vertical bending elements mounted on said movable structures for axial rotation and adapted to form loops in the ends of the severed strand portions when said movable structures are in their operative positions, vertical mandrels carried by said supports and vertically movable from lower inoperative positions to upper operative positions in which they project upwardly from said supports within the arcs described by said bending elements around which the loops are formed by said bending elements, means for lowering said structures to operative positions and for raising said mandrel elements to operative positions, and means for rotating said bending elements to form said loops around said mandrel elements.

10. The mechanism defined in claim 9, wherein said strands are of undulating form, and said movable structures and supports have cooperative means for flattening the undulations near the ends of said strands in response to movement of said movable structures toward said supports.

11. The mechanism defined in claim 10, wherein said supports have elongated horizontal grooves in the top surfaces for the reception of said strands.

12. Mechanism for making a strand-reinforced piece of fabric or like material, comprising means for longitudinally feeding a strand into the material from one side thereof to the other, a cutter adapted to sever the portion of said strand in the material from the remainder thereof, means for twisting the ends of the severed strand portion into loops including separate support structures at opposite sides of material, said support structures being disposed at one side of the feed path of the strand and facing said path, movable structures opposed to said support structures and movable transversely of said feed path from a retracted position at the opposite side of said feed path in a direction toward said support structures to an operative position, rotary bending elements on said movable structures adapted to form loops in the ends of the severed strand portion in the operative positions of said movable structures, and mandrel elements respectively carried by one of the structures at each side of the material and disposed within the arcs described by said bending elements around which the loops are formed by said bending elements.

13. The mechanism defined in claim 12, wherein said cutters are respectively carried by one of the structures at each side of the material.

14. The method of making a strand-reinforced piece of fabric or like material, comprising longitudinally feeding a strand into the material, severing the portion of the strand in the material from the remainder thereof, twisting the ends of the severed strand portion into loops, and holding the strand portion near said ends thereof in a flattened condition during the twisting of said ends into loops.

References Cited by the Examiner
UNITED STATES PATENTS

| | | | |
|---|---|---|---|
| 2,218,749 | 10/1940 | Heilman | 140—3 |
| 2,477,053 | 7/1949 | Ewer et al. | 112—174 |

CHARLES W. LANHAM, *Primary Examiner.*